United States Patent [19]

Channell

[11] Patent Number: 4,910,876

[45] Date of Patent: Mar. 27, 1990

[54] LEVEL ATTACHMENT

[76] Inventor: John F. Channell, 47 Taylor Ave., Woodacre, Calif. 94973

[21] Appl. No.: 404,187

[22] Filed: Sep. 7, 1989

[51] Int. Cl.$^4$ ............................................. G01C 9/02
[52] U.S. Cl. ...................................... 33/374; 33/373; 33/194; 33/428; 33/376
[58] Field of Search ................. 33/374, 375, 451, 194, 33/427, 464, 479, 480, 478, 365, 376, 404, 419, 429

[56] References Cited

U.S. PATENT DOCUMENTS

| | | | |
|---|---|---|---|
| 126,527 | 5/1872 | Disston et al. | 33/480 |
| 733,302 | 7/1903 | Van Court | 33/478 |
| 2,761,215 | 9/1956 | Macklanburg | 33/480 |
| 2,973,584 | 3/1961 | Snapp | 33/464 |

FOREIGN PATENT DOCUMENTS 558409  5/1923  France .................. 33/451

Primary Examiner—William A. Cuchlinski, Jr.
Assistant Examiner—Daniel G. DePumpo
Attorney, Agent, or Firm—Owen, Wickersham & Erickson

[57] ABSTRACT

An attachment for connection with an elongated carpenter's level for forming an enlarged squaring tool, the level having a central web portion with spaced apart bubble indicators and parallel flanges at opposite end edges of the web portions. The attachment has an elongated arm member of rigid material with a connector arm fixed to and extending from it at a right angle. The connector arm has an elongated slot means forming a pair of spaced apart connector members, each having a peripheral cross section similar to but slightly smaller than the cross section of pockets located on opposite sides of the level web portion so that the connector members can be moved axially into said level pockets to firmly, but temporarily, secure the attachment to the level.

5 Claims, 2 Drawing Sheets

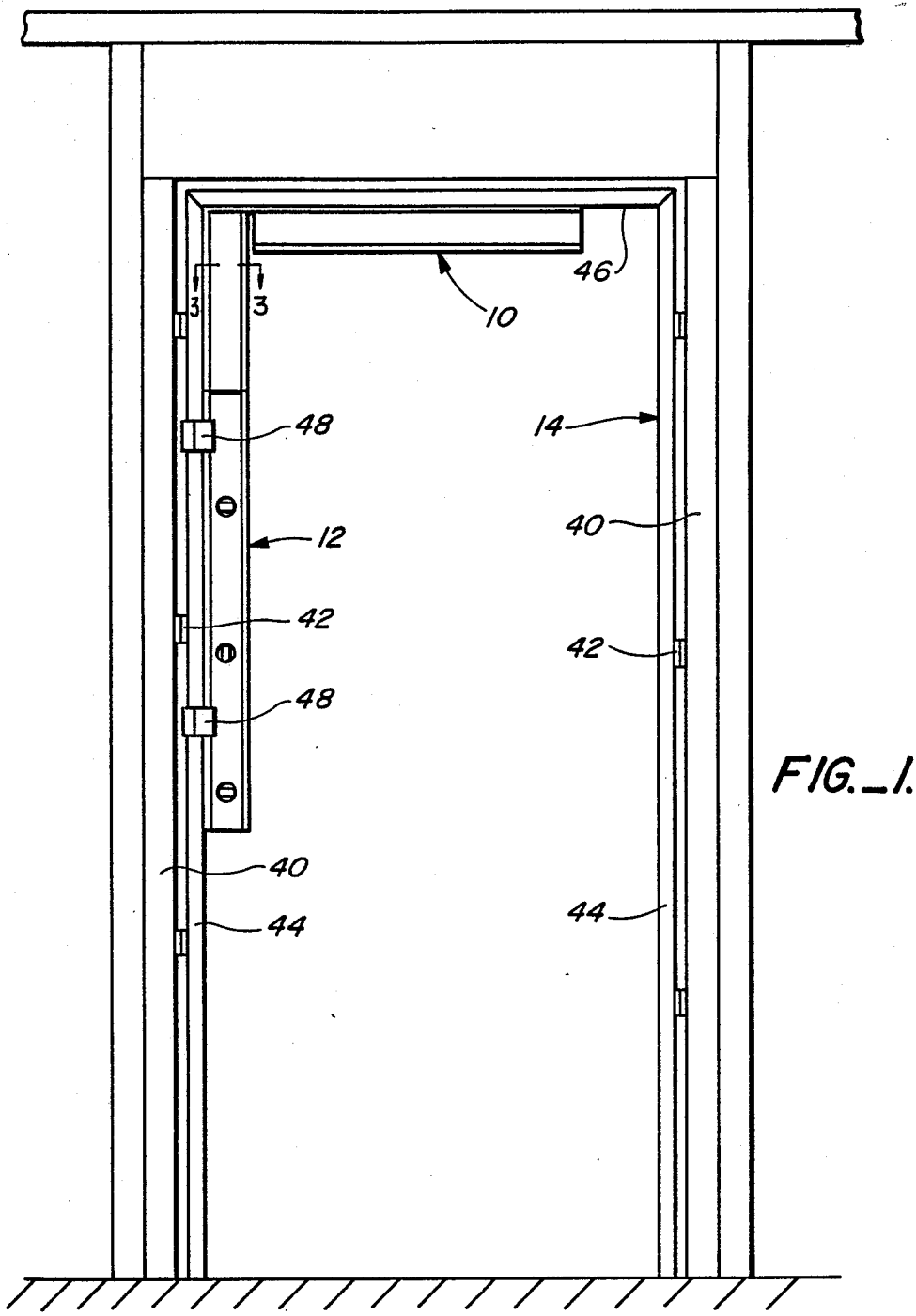

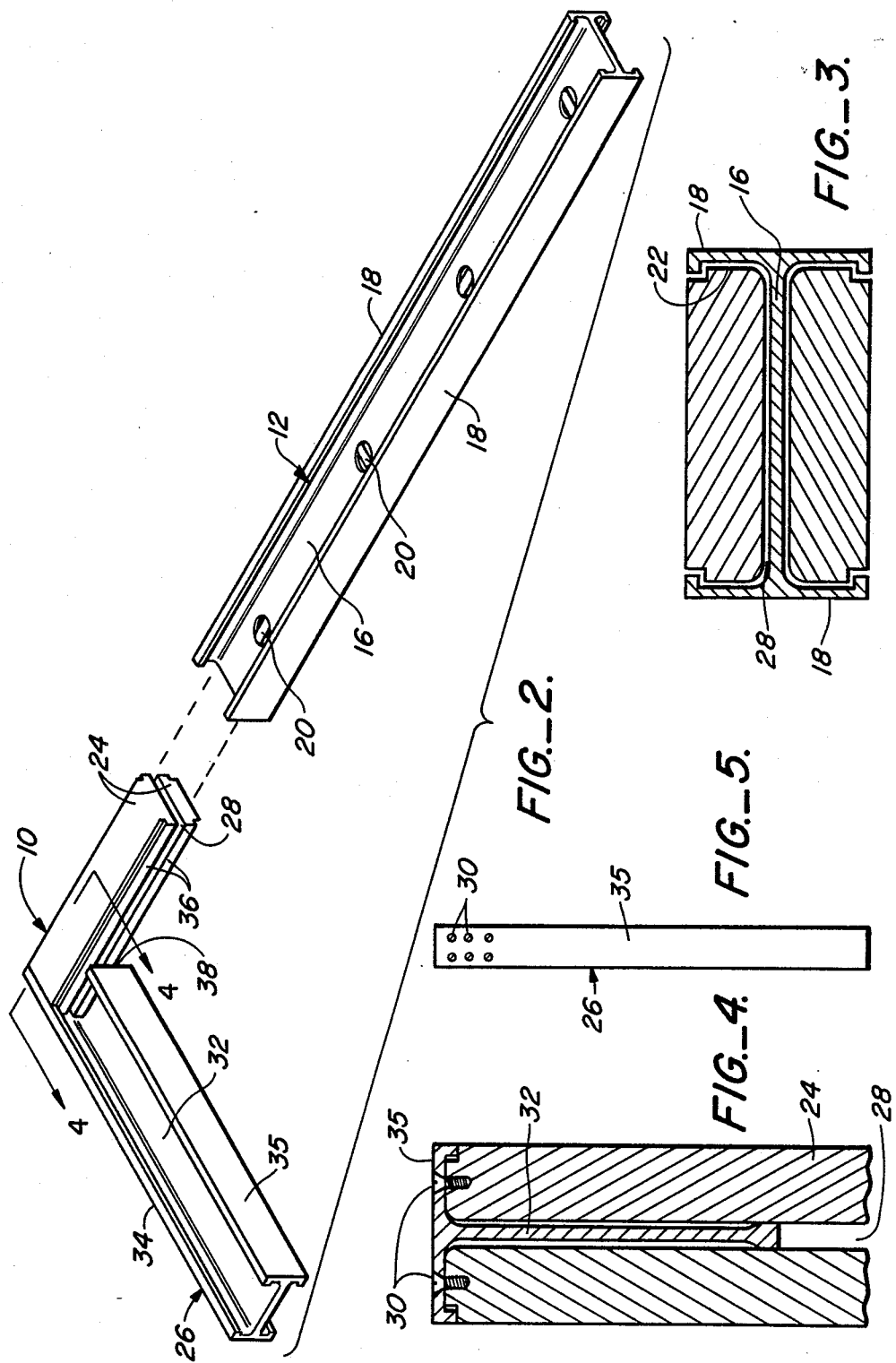

LEVEL ATTACHMENT

This invention relates to carpentry hand tools and more particularly it relates to a right angle device adapted for attachment with a conventional level for use in installing building components.

BACKGROUND OF THE INVENTION

In many building or carpentry operations it is necessary to establish the level or plumbness of a first member while simultaneously maintaining another member at a precise right angle to the first member. For example, in the installation of a door jamb assembly, a pair of side members must be placed in a plumb or vertical position while a top interconnecting member is held precisely horizontal before these members are nailed into place. Accordingly, a general object of the present invention is to accomplish the aforesaid operation more efficiently by the provision of a tool which enables an unassisted carpenter to position and install a first member with precise plumbness and then an attached member at a precise right angle to the first member.

Another object of the invention is to provide a right angle attachment that can be quickly and easily connected to a conventional level, such as a door level, to provide a greatly enlarged square type tool.

Another object of the invention is to provide an improved method for installing a conventional door jamb.

Yet another object of the invention is to provide an attachment for a conventional door level that can be quickly and easily connected to the level for a square device having a precise right angle and also that is particularly well adapted for ease and economy of manufacture.

SUMMARY OF THE INVENTION

A right angle attachment according to the invention is particularly adapted to be quickly connected with an elongated carpenter's level to provide a tool for use in installing door jambs or in doing other similar jobs where precise level or plumbness of construction elements must be maintained. A conventional carpenter's level has an I-shaped cross section. An attachment device embodying principles of the present invention has a first connecting arm and a second rm rigidly attached to the first arm and extending therefrom at a precise angle of 90°. The first arm is comprised of a pair of rigid members that are spaced apart by a short distance which is only slightly greater than the thickness of the web portion of the level to which the attachment is connected. The rigid members are also shaped in cross-section so as to fit snugly between opposite edge flanges of the level. The second arm or main body of the attachment device is rigidly attached to and extends from the first arm. It also provides a slot means therewith for receiving one edge flange of the carpenter's) Thus, the attachment device is connected to the level there is a mating of the adjoining portions of the attachment and level so that a firm right angle connection is formed that maintains a precise 90° angle.

In use, where structural elements such as the vertical and horizontal components of a door jamb are being installed, the level itself is first positioned in a plumb position adjacent a vertical structural element before being clamped in place to the vertical element. Now, the horizontal structural element is moved adjacent to the attachment main body arm and then clamped. With both vertical and horizontal structural elements clamped firmly in place, suitable fasteners can be used to install them permanently. Thereafter, the clamps are removed to release the level and the connected attachment.

Other objects, advantages and features of the invention will become apparent from the following detailed description of one embodiment thereof, presented in conjunction with accompanying drawing.

BRIEF DESCRIPTION OF THE DRAWING

FIG. 1 is a view in elevation showing a level attachment according to the invention as it appears in use for installing a door jamb.

FIG. 2 is a view in perspective of the level attachment of FIG. 1 as it appears when separated from a conventional door level.

FIG. 3 is an enlarged view in section taken along line 3—3 of FIG. 1.

FIG. 4 is a view in section taken along the line 4—4 of FIG. 2.

FIG. 5 is a top view of the level attachment according to the invention.

DETAILED DESCRIPTION OF EMBODIMENT

With reference to the drawing, FIG. 1 shows a right angle attachment 10 embodying principles of the present invention as it appears when connected to a conventional carpenter's level 12. As shown, the combined level and attachment 10 form a relatively large right angle square which is particularly well adapted for installing a door jamb 14, as will be described below.

The carpenter's level 12, as shown in FIG. 2, may be of the well known type, commonly referred to as a door level, which is relatively long (e.g. 4 feet). Such a level is normally made of a suitable metal and has an I-shaped cross section comprised of a web portion 16 and parallel flange members 18. Readable bubble indicator members 20 are spaced along the web portion to enable the level to be held in either a precise vertical or horizontal position. In cross section, as shown in FIG. 3, the I-shaped level has a pair of elongated pockets 22 on opposite sides of the web portion 16 which are also defined by the flange members 18.

As also shown in FIG. 2, the attachment 10 comprises a pair of rigid, spaced apart connector members 24 which are fixed to one end of an extending arm member 26. Each connector member 24 has a cross sectional shape which is similar to bu slightly smaller than the cross-sectional shape of an aforesaid elongated level pocket 22. Each connector member 24 may be made of a rigid durable material, preferably metal such as aluminum. As shown, these members 24 may be solid or they may be provided with internal lightening holes (not shown) but with the same exterior shape. The connector members 24 are spaced apart by a slot 28 having a uniform width along their length that is only slightly greater than the thickness of the level web 16. At one end, both connector members 24 are rigidly fixed to the arm member 26 by suitable means such as weldments or machine screws 30, as shown in FIG. 4.

The arm member 26 may also have an I-shaped cross section comprised of a central web portion 32 and parallel upper and lower flange portions 34 and 35. As shown in FIG. 2, the web portion 32 and the lower flange portion 35 both terminate at a spaced distance from the inner edge surfaces 36 of the parallel, spaced apart connector members 24 and thereby forming a slot 38. The upper flange member 34 of the extended arm 26 extends beyond the end of its web portion 32 and lower flange member 35 and thus over the upper ends of the connector members 24. This enables the fasteners 30 to be placed through the upper flange member 34 to secure it against ends of the connector members 24 as shown in FIGS. 4 and 5.

The attachment 10, as described, is quickly and easily connected to the level 12 to form an enlarged, right angle square. As shown in FIG. 2, the connector members 24 fit snugly within the level pockets 22 and slide with only moderate friction, over the level web portion 16. As this occurs, the inner flange of the level 12 moves within the slot 38 formed between edge surfaces 36 of the connector members 24 and the web and flange 35 of the extended arm 26. When the attachment 10 is fully connected to the level 12 a rigid, enlarged square is provided which can be oriented to a plumb or level position by virtue of the bubble indicators on the level 12.

As shown in FIG. 1, the attachment 10 and level 12, when connected, provide an enlarged square that is particularly useful for installing door jambs. The door jab is normally a three piece wooden assembly 14, as shown in FIG. 1, which must be fastened to structural members 40 surrounding the door opening of a building. Before the jamb can be permanently fastened it must be positioned by shims 42 so that its vertical members 44 are precisely vertical or plumb and the top cross member 46 is horizontal or level. Using the combined attachment and level, the level 12 is first placed against one vertical jamb member 44 to position it in a vertical orientation. With appropriate shims 42 in place between the vertical jamb member and adjacent structure, the level is clamped to the vertical jamb member by suitable clamps 48 as it is permanently nailed in place. Before being clamped, the upper edge of the attachment 10 is placed flush against and clamped to the edge of the upper jamb member 46, thereby making it precisely horizontal or level. At this point the upper jamb member can be permanently fastened to a wall structure. Thereafter, the clamps 48 on the level can be removed, so that the attachment and level can be switched to the other side of the jamb assembly to check plumbness and then fasten the other vertical jamb member. Using the attachment 10 and level 12 in combination enables one carpenter to install a door jamb rapidly with precision and without the need for a helper to complete the job. Other carpentry jobs similar to door jamb installation where a large right angle orientation coupled with a plumbness or level positioning of structural members is required may also be readily accomplished utilizing the attachment 10 according to the invention.

The preferred embodiment described herein is intended to be purely illustrative, and not limiting of the scope of the invention. Other embodiments and variations will be apparent to those skilled in the art and may be made without departing from the essence and scope of the invention as defined in the following claims.

What is claimed is:

1. An attachment for an elongated carpenter's level having an I-shaped cross-section comprised of a central web portion with spaced apart bubble indicators and parallel flanges at opposite end edges of the web portions, said web portion and flanges forming elongated pockets on opposite sides of said web portion, said attachment comprising:

an elongated arm member of rigid material;

a connector arm fixed to and extending at a right angle from one end of said elongated arm member, said connector arm having an elongated slot means forming a pair of spaced apart connector members, each having a peripheral cross section similar to but slightly smaller than the cross section of said level pockets;

whereby said connector members can be moved axially into said level pockets as the level web portion moves into the slot between said connector members so that said attachment becomes firmly but temporarily attached to said level.

2. The attachment as described in claim 1 wherein said connector members are made of a solid material.

3. The attachment as described in claim 1 wherein said elongated arm has an I-shaped cross section comprised of a central web portion and parallel flange portions extending along opposite end edges of said central web portion.

4. The attachment as described in claim 3 wherein said elongated arm has an extended flange portion at one end and fastener means extending through said flange portions into the ends of said connector members.

5. The attachment as described in claim 3 including a second slot means between an end portion of said elongated arm and said connector members for receiving a flange of said level when said attachment is connected therewith.

* * * * *